Sept. 27, 1927.
P. BARRÉ
1,643,869
VULCANIZING MOLDING APPARATUS FOR RUBBER TIRES
Filed Feb. 29, 1924
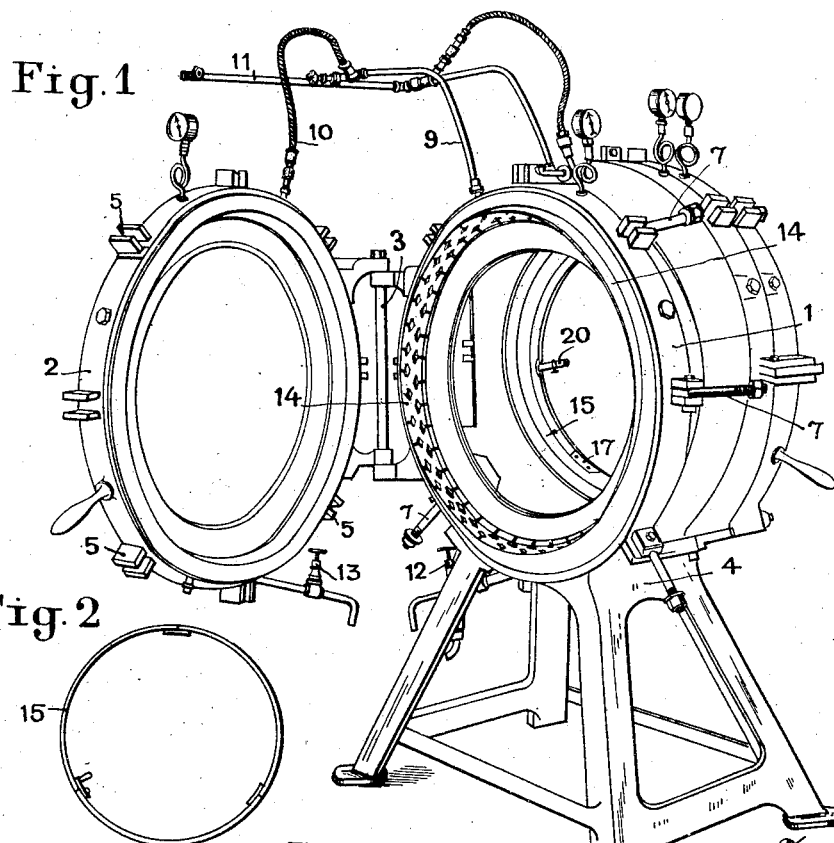
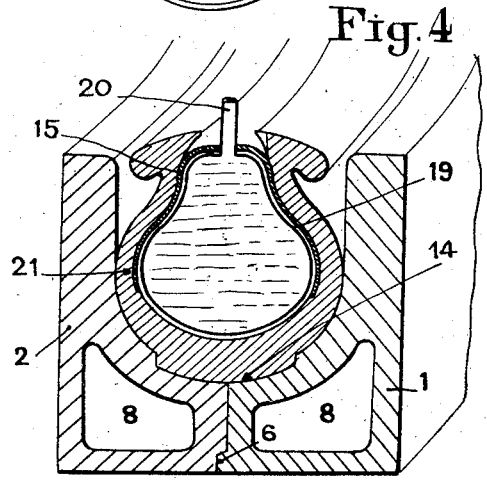
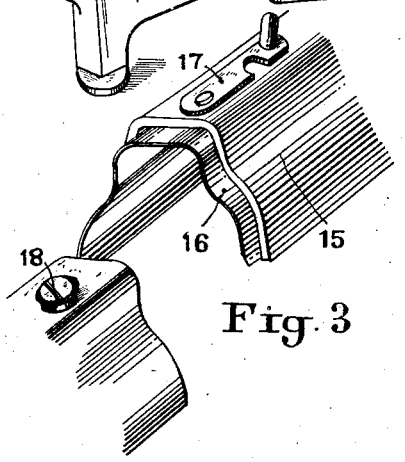
INVENTOR
Paul Barre
BY
ATTORNEYS Patented Sept. 27, 1927.

1,643,869

UNITED STATES PATENT OFFICE.

PAUL BARRÉ, OF PARIS, FRANCE.

VULCANIZING MOLDING APPARATUS FOR RUBBER TIRES.

Application filed February 29, 1924, Serial No. 696,032, and in France March 6, 1923.

This invention has for its object improvements in and relating to vulcanizing molding apparatus for rubber tires.

The said invention is more particularly characterized by the fact that every single mold or vulcanizing chamber which is intended for receiving a tire to be mended or molded again, comprises, on its inner periphery a conveniently removable band or ring, which carries drawings or ornaments to be reproduced on the tire itself, together with a wall or partition or form retaining member for the tire to be mended, the latter receiving, in its inside a conveniently conformable pressure chamber completely filled up with a pressure medium, such as a liquid, in order to secure, together with a convenient heating, a resilient pressure which compels the tire to exactly take the shape of its molding chamber, while preventing the heat to injure the healthy parts of the said tire.

In the accompanying drawing which shows, by way of example, an embodiment of the said invention;

Fig. 1 is a perspective view of a vulcanizing molding apparatus for simultaneously molding two tires;

Fig. 2 shows, on a reduced scale a general view of the shape retaining member;

Fig. 3 is a detail view showing the connecting arrangement for the parts of the said shape retaining member;

Fig. 4 is a cross section of a molding chamber during the molding of a tire.

The device which, according to the invention, is designed for remolding the tires comprises, for every dimension of tire a mold in two parts 1, 2, vertically arranged and connected together, by means of a hinge 3. In the arrangement shown in the drawing, part 1 is fixed for instance by means of bolts on a pedestal 4 of any description, which, itself may be secured on the floor. The member 2, freely pivoted on a hinge 3 is tightly fitted to the part 1 by means of protruding parts 6, and it is provided with lugs 5 in any number, receiving hinged bolts 7 for securing both parts together in the closed position.

Each of the members 1 and 2 is hollow and comprises in its inside an annular chamber 8, both chambers being connected, by means of convenient pipes 9—10 with a steam pipe 11, which is fed by any boiler not shown in the drawing.

Draining cocks 12, 13 provided on the lower part of each chamber 8 are designed for removing condensed water, parts 1 and 2 may thus be conveniently heated.

A removable ring 14, for instance of laminated iron, is arranged in the mold and is provided, on its inner side, with convenient projections for causing the tires to be provided with corresponding hollow ornaments.

Provided inside of the mold is a bearing member hereafter referred to as shape retaining member, constituted by an annular ring 15 having, in cross section the shape indicated in Figs. 3 and 4. The said shape retaining member is divided into a convenient number of parts, three for instance, conveniently connected at their respective ends by means of protruding parts 16, and the connection of the said three parts being secured by means of hinged latches 17 and pins 18, in order to enable the said shape retaining member to be easily put into the tires to be mended or vulcanized.

The operation is as follows:

When a tire is to be provided with a new rubber cover or to be molded again, the said tire, after having been conveniently prepared in a known manner, is fitted with the annular ring 14, conveniently centered. While the said tire is easily handled, it is provided, in its inside, with the shape retaining member 15, by bringing between the said member and the tire itself, a pressure chamber 19 of any matter, provided with a valve 20, which is to be connected with the discharge side of a pump not shown, thus allowing the said chamber 19 to be supplied with fluid, such as for instance water, under a convenient pressure.

The tire being thus prepared, it is brought into the fixed part 1 of the mold, and the movable part 2 is then closed and secured by means of the hinged bolts 7; the tire is thus maintained exactly in the convenient position inside the mold, the shape retaining member 15 thus preventing any deformation of the said tire. Once the bolts 7 conveniently screwed in, the valve 20 is connected with the pressure side of a hand or other pump, which causes a convenient pressure to be established inside the chamber 19, the said pressure being, for instance 10 to 12 kilogrammes per square centimeter for obtaining a convenient result. The chambers 8 are then brought into communication with the boiler not shown, the condensed water being allowed to escape through the cocks 12, 13. When no more water flows through the said cocks 12, 13, the latter are turned off, while retaining the communication between the chambers 8 and the boiler not shown, which maintains in the mold 1—2 the convenient temperature. Such increase of temperature occurs also in the water contained in the chamber 19, which, by expanding, strongly forces the tire to be mended or molded again 21 against the mold wall and the ring 14. Under the combined action of the pressure and of the temperature, the tire thus exactly assumes the shape of the mold 1—2 and of the ring 14, the rubber thus completely filling up the hollow parts of the said ring, so that when the vulcanizing process is at an end, the external band of the said tire is provided with any ornaments or projections which may be desired, owing to the fact that the said rubber, when semi-fluid during its heating, is forced into contact with the ring 14, the projections form hollow ornaments on the tire.

The vulcanizing process is completed after a certain predetermined time.

The communication of the chambers 8 with the boiler not shown is then closed, the mold is open by untightening the bolts 7, and then by pivoting the movable part 2 round the hinge 3, which enables the tire to be easily withdrawn, after the pressure inside the said chambers 19 has been escaped, for instance by opening the valve 20. The chamber 19, together with the shape retaining member 15 are removed, and the apparatus may be used anew immediately for molding another tire, or cover.

I preferably arrange two molds upon every pedestal, as shown in Fig. 1, the said molds being designed either for covers of the same dimension, or for covers of different dimensions, and the said molds may be used simultaneously.

Of course, it could also be possible of arranging four molds or more along the sides of a polygon, which molds may be equally or not equally arranged around a common pedestal such as 4 of Fig. 1. Each mold could also be provided with an independent pedestal, though the arrangement of several molds should be preferable owing to the greater stability.

This arrangement allows the pressure necessary for vulcanizing to be obtained without any expense of force, such pressure being automatically given by the increase of volume communicated to the liquid of the chamber 19 at the temperature of vulcanization. The said pressure may be conveniently regulated, by determining the initial pressure when filling up the chamber 19.

The arrangement of the ring 14 prevents any formation of circular beards on the cover or tire, the said tire when completed having the appearance of a new one.

It is to be noticed that the beards of the cover thus vulcanized are not submitted to the temperature of vulcanization, so that the fabrics which constitute the armature of the said tires are not injured, and that the mending of the rolling band does not, for instance cause any injury to any other part of the cover or tire.

The invention may be applied to the covering and remolding of covers of pneumatic tires of any dimension and of any description, and it may be used generally for mending or manufacturing any objects of india rubber with a simultaneous vulcanization.

What I claim is:

1. In a vulcanizing molding apparatus for repairing pneumatic tires, a shape retaining member for holding the portion of the tire which is not to be repaired out of contact with the mold, said member comprising a plurality of sections having interengaging ends, a pivoted latch on one section and a pin on the other section with which the latch engages.

2. In a vulcanizing molding apparatus for repairing penumatic tires, a shape retaining member for holding the tire in the mold with the portion thereof which is not to be repaired out of contact with the mold, said retaining member comprising a plurality of sections, one having a projecting portion fitting in the other, each section having upwardly and inwardly curved sides and an approximately flat top, and means on the sections for securing them together.

In testimony I have hereunto set my hand at Paris (France) this 12th day of February 1924.

PAUL BARRÉ.